United States Patent
Sakai et al.

(10) Patent No.: US 7,130,647 B2
(45) Date of Patent: Oct. 31, 2006

(54) CORDLESS TELEPHONE SYSTEM

(75) Inventors: Hajime Sakai, Onojo (JP); Yuji Hirai, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 370 days.

(21) Appl. No.: 10/003,046

(22) Filed: Dec. 6, 2001

(65) Prior Publication Data

US 2002/0082000 A1     Jun. 27, 2002

(30) Foreign Application Priority Data

Dec. 27, 2000   (JP)   .............. 2000-397682

(51) Int. Cl.
- H04B 1/38   (2006.01)
- H04B 1/40   (2006.01)
- H04M 3/00   (2006.01)
- H04M 1/00   (2006.01)

(52) U.S. Cl. .................. 455/463; 455/420; 455/556.1; 455/74.1; 379/428.04

(58) Field of Classification Search ............. 455/426.1, 455/426.2, 457, 457.1, 462, 465, 557.1, 414.2, 455/566, 95, 414.1, 463, 456.5, 420, 74.1, 455/556.1; 358/405
See application file for complete search history.

(56) References Cited

U.S. PATENT DOCUMENTS

| | | | | |
|---|---|---|---|---|
| 5,010,565 A | * | 4/1991 | Nash et al. ................ | 455/74.1 |
| 5,020,090 A | * | 5/1991 | Morris ..................... | 455/556.1 |
| 5,021,890 A | * | 6/1991 | Yoshida et al. ............ | 358/405 |
| 5,127,050 A | * | 6/1992 | Takahashi et al. ..... | 379/428.04 |
| 5,509,050 A | * | 4/1996 | Berland ..................... | 455/557 |
| 5,515,420 A | * | 5/1996 | Urasaka et al. ............ | 455/564 |
| 5,752,195 A | * | 5/1998 | Tsuji et al. ................. | 455/462 |
| 5,761,618 A | * | 6/1998 | Lynch et al. ............... | 455/419 |
| 5,898,919 A | * | 4/1999 | Yuen .......................... | 455/420 |
| 6,201,951 B1 | * | 3/2001 | Duwaer et al. ............ | 455/74.1 |
| 6,285,889 B1 | * | 9/2001 | Nykanen et al. ........... | 455/557 |
| 6,289,213 B1 | * | 9/2001 | Flint et al. .................. | 455/420 |
| 6,308,062 B1 | * | 10/2001 | Chien et al. ................ | 455/420 |
| 6,490,458 B1 | * | 12/2002 | Campbell ................... | 455/463 |
| 6,507,734 B1 | * | 1/2003 | Berger et al. .............. | 455/410 |
| 6,553,240 B1 | * | 4/2003 | Dervarics .................. | 455/566 |
| 6,611,681 B1 | * | 8/2003 | Henderson ................. | 455/413 |
| 6,615,049 B1 | * | 9/2003 | Yang .......................... | 455/462 |
| 6,728,456 B1 | * | 4/2004 | Aylward et al. ........... | 455/462 |

(Continued)

FOREIGN PATENT DOCUMENTS

CN       1115593 A      1/1996

(Continued)

OTHER PUBLICATIONS

Chinese Office Action dated Oct. 15, 2004 with English Translation.

(Continued)

Primary Examiner—George Eng
Assistant Examiner—Kiet Doan
(74) Attorney, Agent, or Firm—Stevens, Davis, Miller & Mosher, LLP (57) ABSTRACT

A cordless telephone system comprises a base unit which cam accept information services for stationary telephone sets, and which can transmit and receive various signals by way of networks, and a wireless handset which wirelessly communicates with the base unit in two-ways, wherein the wireless handset can accept information services for stationary telephone sets in pair with the unit. With this arrangement, information obtained from the information services for stationary telephone sets can be seen even at a position remote from the base unit.

19 Claims, 8 Drawing Sheets

U.S. PATENT DOCUMENTS

| | | | |
|---|---|---|---|
| 6,728,546 B1 * | 4/2004 | Peterson et al. | 455/462 |
| 6,735,432 B1 * | 5/2004 | Jarett et al. | 455/417 |
| 6,741,871 B1 * | 5/2004 | Silverbrook et al. | 455/557 |

FOREIGN PATENT DOCUMENTS

| | | |
|---|---|---|
| EP | 0563864 | 10/1993 |
| JP | 678073 | 3/1994 |
| JP | 07336766 | 12/1995 |
| JP | 993319 | 4/1997 |
| JP | 10200493 | 7/1998 |
| JP | 11348386 | 12/1999 |
| JP | 2000069199 | 3/2000 |
| JP | 2000299888 | 10/2000 |
| JP | 2001188736 | 7/2001 |
| JP | 2001195209 | 7/2001 |
| WO | WO 92/03878 * | 7/1991 |
| WO | 9510922 | 4/1995 |
| WO | 0044168 | 7/2000 |

OTHER PUBLICATIONS

"DECT Forum News Letter, Passage," vol. 3, No. 2, XP002941301, pp. 1-4, Dec. 1999.

Japanese Offce Action dated May 10, 2005 with English translation.

* cited by examiner

| | | |
|---|---|---|
| S NEWSPAPER | TRAFFIC ITEM | 12:15 3/30 2001 |
| N NEWSPAPER | STOCK INFORMATION | 14:45 3/28 2001 |
| ABB NEWS | BOND | 18:20 3/20 2001 |
| B NEWSPAPER | STOCK INFORMATION | 18:00 3/18 2001 |

CORDLESS TELEPHONE SYSTEM

FIELD OF THE INVENTION

The present invention relates to a cordless telephone system incorporating a base unit set and an wireless handset, and in particular to a cordless telephone system which can accept external information service.

BACKGROUND OF THE INVENTION

These years, mobile telephones which can accept information services from various companies have rapidly been widespreadly used, and as a result, stationary telephone sets which can accept the information services have been also developed. It is noted that the information services include services for connection to information sites in which several many information menus have been prepared, or services for connection to information sites on internets.

Explanation will be hereinbelow made of a method of connection of a stationary (desk-top and wire type) telephone set which can accept information services, with an information site.

Figure 10:
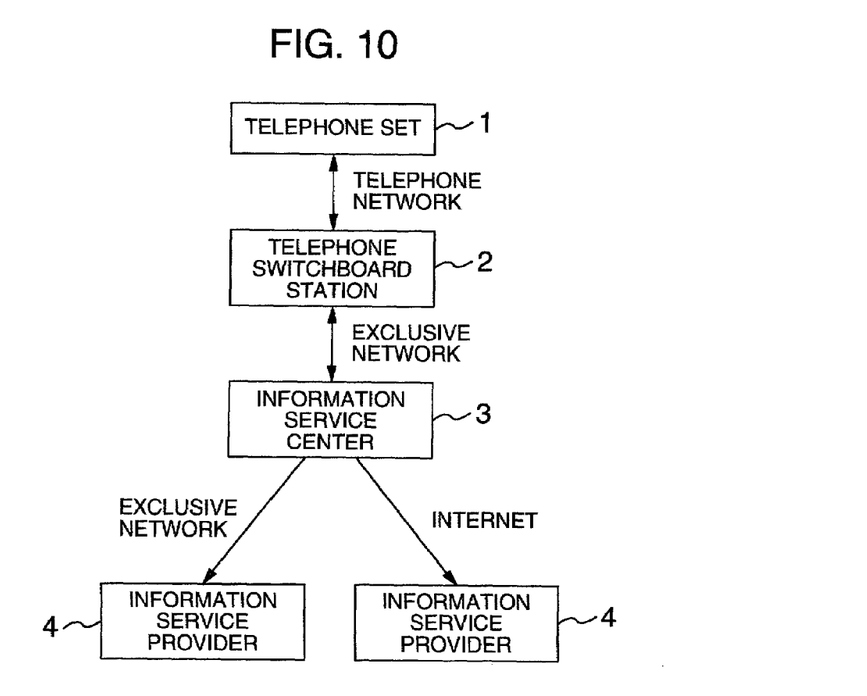
FIG. 10 is a schematic view for explaining a method of connection to an information site in a conventional telephone system.
Figure 11:
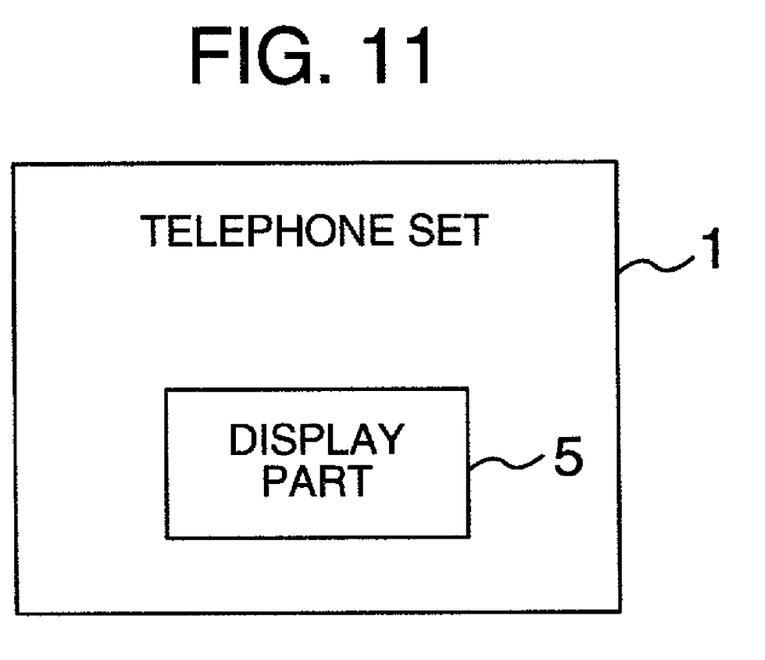
FIG. 11 is a block diagram illustrating a configuration of the conventional telephone system.

FIG. 10 is a schematic view for explaining a method of connection of a conventional telephone set to an information site, and FIG. 11 is a block diagram illustrating a configuration of the conventional telephone set.

As shown in FIG. 10, when the user uses an information service, the user calls the information service center 3 from the telephone set 1 by way of a telephone exchange station 2. It is noted that the information service center 3 and an information service provider 4 side are connected with each other through an exclusive network or an internet, and further, information provided by the information service 4 side are prepared on the information service center in the form of several information menus.

If the information menus provided by the information service provider 4 can be obtained by connecting the telephone set 1 with the service center through the exclusive network in such a case that the information service provider 4 is connected with the information service center 3 or through the internet in such a case that the information service provide 4 is connected with the service center 3 through the internet. That is, in the case of using the internet, the information service center 3 has a role of a sole provider for information services. Further, the information service center 3 is a base station for carrying out the above-mentioned services.

Incidentally, as to the so-called "i-mode" which is in popular at present, and which is a Trade Mark of an NTT Docomo Co., an i-mode center for i-mode services is one of the information service centers. The information service center 3 is connected to an information service provider 4 through an exclusive network, or is connected to an information service provider 4 on internets with the use of the internets. That is, the information service provider 3 has a role of a telephone exchange station for connecting an information service center 3 with the telephone set 1.

Further, as shown in FIG. 11, the telephone set 1 has a display part 5 having its screen on which image information from the information service center is displayed.

SUMMARY OF THE INVENTION

An object of the present invention is to provide a cordless telephone system which can receive an information service obtained on a stationary (desk-top and wire type) telephone set as a base unit, with an wireless handset at a position remote from the stationary telephone set.

It is noted that the wireless handset such as a cordless phone, a PHS or a mobile phone can carry out wireless-communication with the base unit.

According to the present invention, there is provided a cordless telephone system comprising a base unit which can accept information services for a stationary telephone set, and which is adapted to receive and transmit various signals through networks, and an wireless handset which carries out wireless communication with the base unit in two-ways, wherein the base unit and the wireless handset can cope in pair with information services for the stationary telephone set.

DESCRIPTION OF THE PREFERRED EMBODIMENT

The present invention will be hereinbelow detained in an embodiment form of the present invention.

Figure 1:
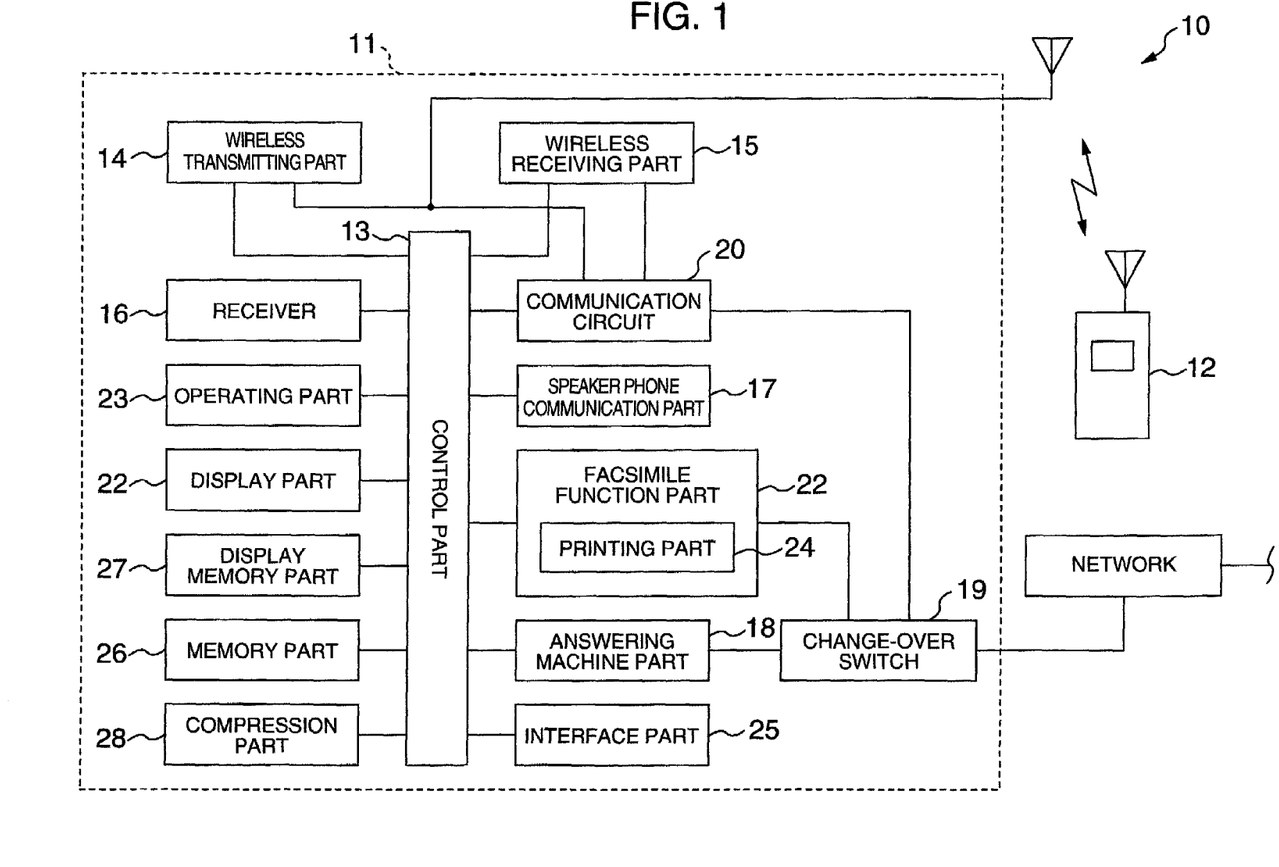
FIG. 1 is a block diagram illustrating a structure of a base unit in a cordless telephone system in an embodiment of the present invention.

Referring to FIG. 1 which is a block diagram illustrating a configuration of a base unit in a cordless telephone system 10 in an embodiment of the present invention, the cordless telephone system 10 has the base unit 11 connected to networks and at least one wireless handset 12 which can be wireless-communicated with the base unit in two-ways within a predetermined extent (100 to 150 m). It will be hereinbelow explained that the wireless handset 12 in the cordless telephone system 10 shown in FIG. 1 is a PHS telephone as a premise. However, the present invention should not be limited to this configuration but can be applied to such a configuration that the wireless handset is a mobile telephone.

(Configuration of the Main Phone)

Referring to FIG. 1, the base unit 11 transmits and receives voice signals to and from an external telephone under control of a control part 13, and carries out wireless-communication with the wireless handset in two-ways by way of a wireless transmitting part 14 and a wireless receiving part 15 for the wireless communication. This control part 13 has a CPU, a ROM and the like, and has a role of controlling the base unit in its entirety.

Further, since the base unit 11 incorporates a receiver 16 connected thereto with a cord, the cordless communication (indoor communication) can be made with the wireless handset 12 or communication can be made with an external telephone through a network (outside communication) when the base unit is hooked off by picking up the receiver 16. Further, since the base unit 11 incorporates a speaker phone communication part 17, the communication can be made in a hands-free manner when a switch (which is not shown) for the speaker phone communication part 17 is turned on so as to hook off the base unit 11.

Further, since the base unit 11 incorporates an answering machine part 18, if the base unit 11 or the wireless handset 12 is not hooked off even though a call enters from the networks, the answering machine part 18 is energized so as to record a message which has entered. In this case, if the base unit is not hooked off even after a call bell is rung at a predetermined number (for example, 6) of times, the control part 13 is capable of changing over a change-over switch 19 from a communication circuit part 20 into the answering machine part 18.

Further, the base unit 11 has a facsimile function part 22, and accordingly, when the control part 13 receives a CNC signal as a switch for starting facsimile communication, the control part 13 changes over the change-over switch 19 from the communication circuit part 20 into the facsimile function part 21 in order to carry out facsimile communication.

Further, since the content of a received facsimile is displayed on a display part 22, if the facsimile is sufficient at one glance without the necessity of printing, a printer part 24 in the facsimile function part 21 is not operated, but if it should be printed, an operating part 23 is manipulated so as to operate the printer part 24 for printing thereof.

Further, the base unit 11 in this embodiment has three kinds of memory. A first memory stores a telephone directory having abbreviated telephone numbers, and accordingly, when the user inputs an abbreviated telephone number into the base unit or the wireless handset with which the user starts calling, the user can call a conversation partner by means of a telephone number corresponding to the abbreviated telephone number stored in the first memory. Further, a second memory is a temporary memory for displaying an information received by the base unit through a network, on the display part 22 in the base unit, and a third memory can be stored therein with a received information under instructions from the operating part on the base unit or the wireless handset as detailed later, and further, can be stored therein with an image read by a scanner (which is not shown). Referring to FIG. 1, the first memory and the third memory are included in a memory part 26 while the second memory is included in a display second memory part 27.

Further, the base unit 11 is capable of transmitting an information stored in the display memory part 27, to the wireless handset after the information is compressed by the compression part 28 when it is wireless-transmitted to the wireless handset.

By the way, the cordless telephone system 10 has an interface part 25 with which an external equipment can be used. This interface part 25 may be the one which can carry out infrared communication in a wireless manner or which uses a communication cable. The external equipment capable for being connected to the interface part 25 is, for example, a laser printer or the like which enables high quality printing, or a facsimile device such as a laser facsimile device or the like.

However, in the case of connection of the facsimile device as the external equipment to the interface part 25, a facsimile simulating adapter incorporating a pseudo-bell generating circuit, a running current generating circuit or the like is required since the facsimile device as the external equipment is used with such simulation that the facsimile device receives facsimile data.

(Service Connection from the Base Unit)

Next, explanation will be made of a method of connection to an information site given by an information service provider through the manipulation of the base unit in the cordless telephone system in this embodiment.

Although the method of connection thereof is substantially similar to that of the prior art shown in FIG. 10, some explanation thereto will be added more or less.

Figure 2:
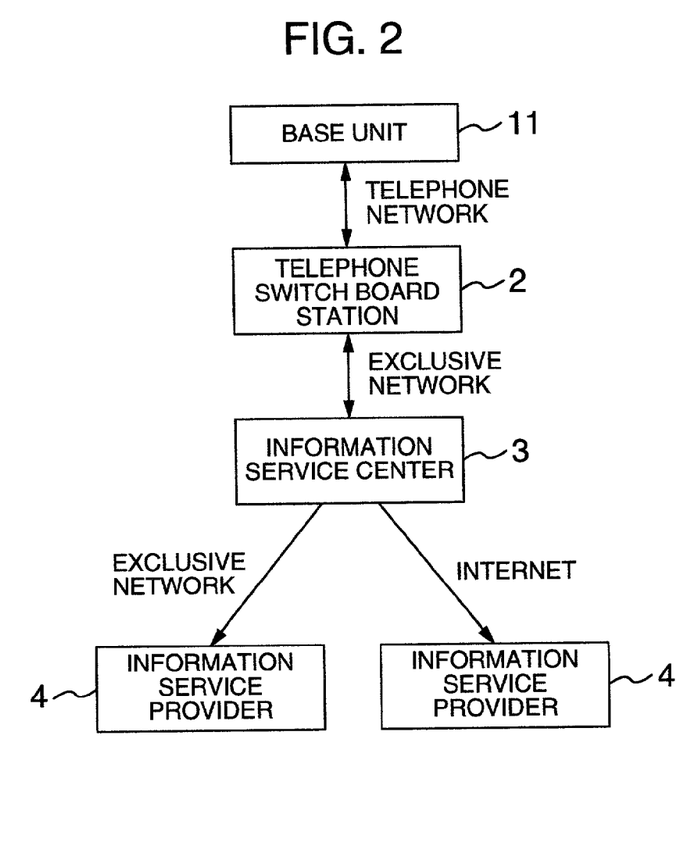
FIG. 2 is a schematic view for explaining a method of connection of the base unit to an information side in the embodiment of the present invention.

As shown in FIG. 2, when the user is to use an information service for stationary telephone sets, as shown in FIG. 2, at first calling is made to an information service center 3 from the base unit 11 by way of a telephone exchange station 2.

Figure 3:
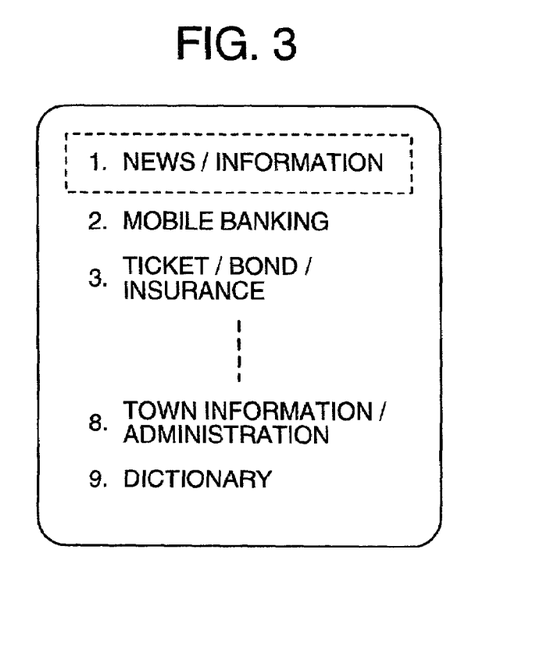
FIG. 3 is a view illustrating a display screen in a display part of the base unit in the cordless telephone system in the embodiment of the present invention.
Figure 4:
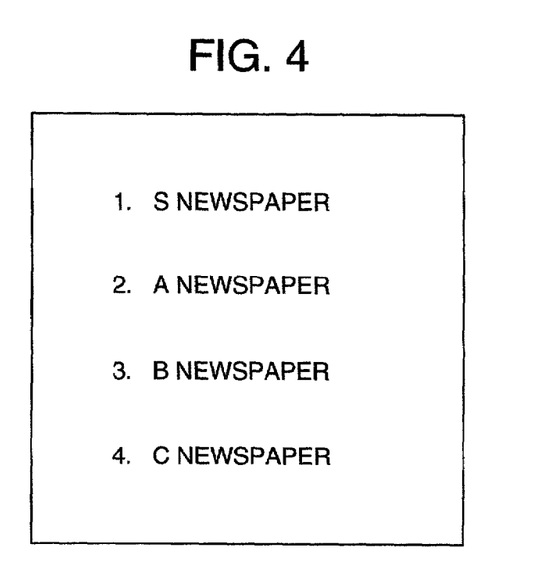
FIG. 4 is a view illustrating the display screen in the display part of the base unit in the cordless telephone system in the embodiment of the present invention.

As shown in FIG. 2, the information service center 3 is connected to the information service provider 4 through the intermediary of an exclusive network or the internet, and several menus of information provided by the information service provider 4 have been set on the information service center 3. As shown in FIG. 3, when a first item "News/Information" in the list of menu is selected, the image on the screen is changed over into an image having several information menus relating to the news and the information as shown in FIG. 4. These information menus are grouped into a no charge group and a charge group. However, irrespective of whether an item to be used by the user in the list is charged or not, the user can open the information menu by registering the item in the list to the cordless telephone system 10. As mentioned above, when a first item "S newspaper" in the information menu is selected, the information menu is transmitted through the intermediary of the exclusive network if the information service center 3 is connected to the information service provider 4 by way of the exclusive network or through the intermediary of the internet if the information service center 3 is connected to the information service provider 4 by way of the internet. It is noted here that if the internet is used, the information service center 3 has a role of a sole provider in the information service.

Since there is used such a charge system that as a charge information menu is registered, a registry fee corresponding to the registered information menu is charged to the user, it is required to maintain a certain number of information menus to be registered in order to avoid wasting money.

Further, among these menus, those which allows transactions with a bank are present, and accordingly, in the case of transactions with a bank, a personal identification number (usually having four digits) which has been registered in the bank should be inputted, otherwise it cannot be used. The information service center 3 is connected through an exclusive network to such an information service provider 4 having confidentiality, and accordingly, other than specified persons which have been registered in the information service center 3 can never use the information.

As mentioned above, when the user connects the cordless telephone system to the information site produced by the information service provider 4 by way of the information service center 3, the information from the connected information site is displayed on the display part 22 of the base unit 11 on the user's side.

Further, if it is sufficient to read the information displayed on the display part 22 at one glance, no printing is made, but if it is required to be printed for recording, the print part 24 in the facsimile function part 21 functions when the operating part 23 is manipulated, and accordingly, the image information displayed at present on the display part 22 is stored in the memory 26, and is printed by the printing part 24 (as will be detailed later). Further, if high quality printing is desired, an external equipment such as a laser printer or a laser facsimile machine is connected to the interface part 25 (through the intermediary of an adapter as necessary), thereby it is possible to print various information received by the base unit 11 with high quality.

Further, in this embodiment, designated one of various image information stored in the memory, which is designated and displayed on the display part 22 can be sent to the external facsimile machine by designating a telephone partner with the use of an abbreviated telephone number (as will be explained later).

(Service Connection from the Wireless Handset)

Explanation has been hereinabove made of the method of connection to an information site through the manipulation of the base unit 1. In this embodiment in which the wireless handset 12 can accept the information service for stationary telephone sets through the intermediary of the base unit 11, the wireless handset 12 can be connected with an information site when it is manipulated.

Figure 6:
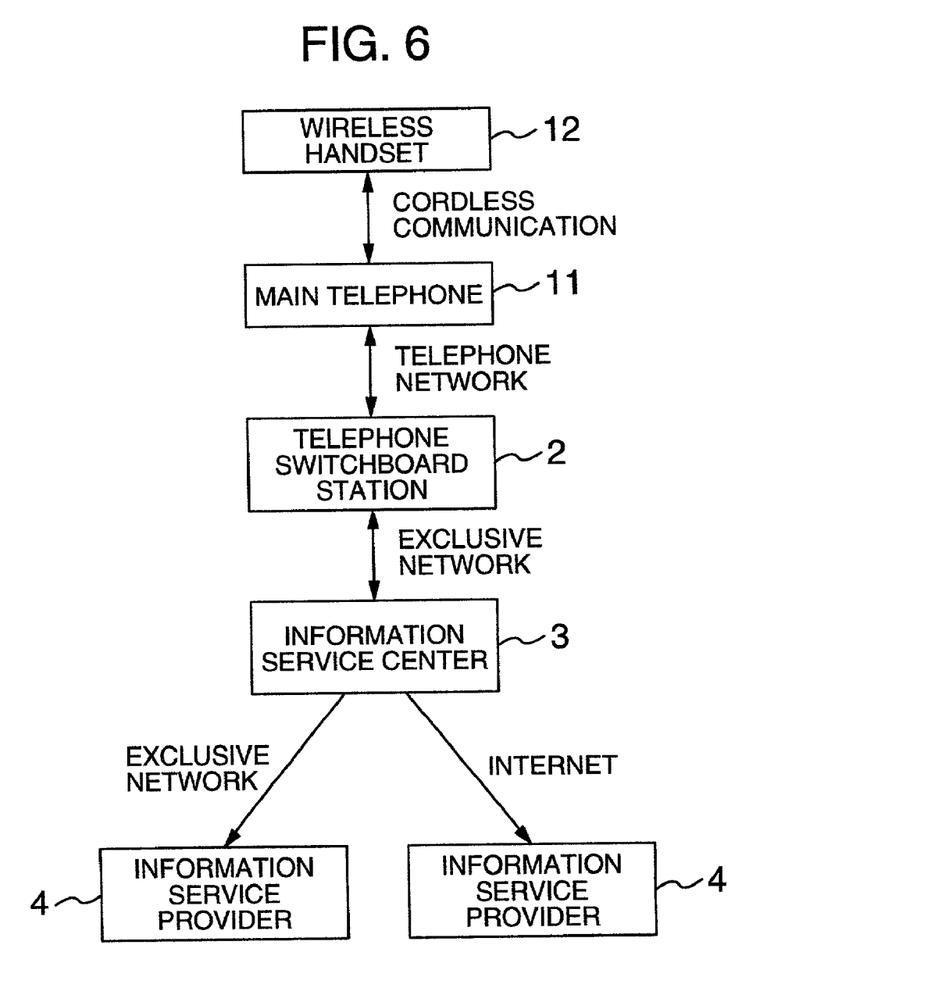
FIG. 6 is a schematic view for explaining a method of connection to an information site from an wireless handset in the cordless telephone system in the embodiment of the present invention.
Figure 7:
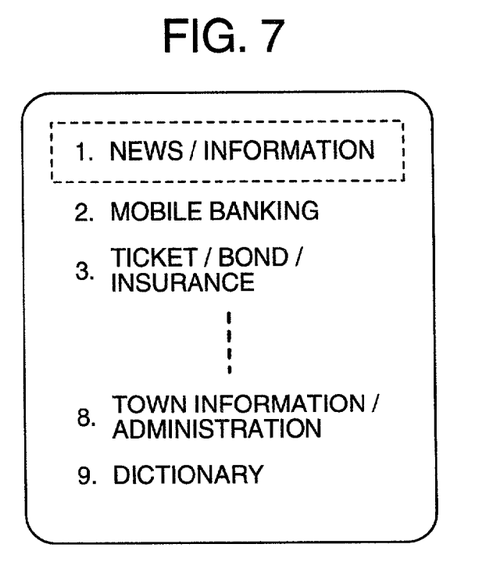
FIG. 7 is a view illustrating a display screen in a display part of the wireless handset in the embodiment of the present invention.
Figure 8:
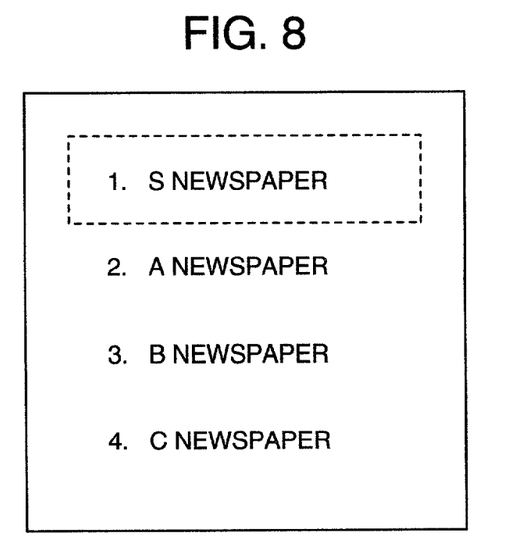
FIG. 8 is a view illustrating the display screen in the display part of the wireless handset in the embodiment of the present invention.

Explanation will be hereinbelow made of a method of connection of the wireless handset 12 to an information site through the manipulation of the wireless handset 12. Further, as shown in FIG. 6, in the case of using an information site for stationary information telephone sets with the use of the wireless handset 12 by the user, at first wireless communication is made from the wireless handset 12 to the base unit 11 so as to call the information service center 3 from the base unit 11 by way of the telephone exchange station 2. Since the information servie center 3 and the information service provider 4 are connected together through an exclusive network or the internet therebetween, the information service center 3 connects this call to the information service provider 4 where an information site to be connected by the user is provided.

Further, an information menu with which the user has been registered from the base unit side, is also automatically registered for the wireless handset side, and accordingly, it is not required for the user to reregister again as to one and the same information menu from the wireless handset side.

(Configuration of the Wireless Handset)

Next, explanation will be made of the configuration of the wireless handset.

Figure 5:
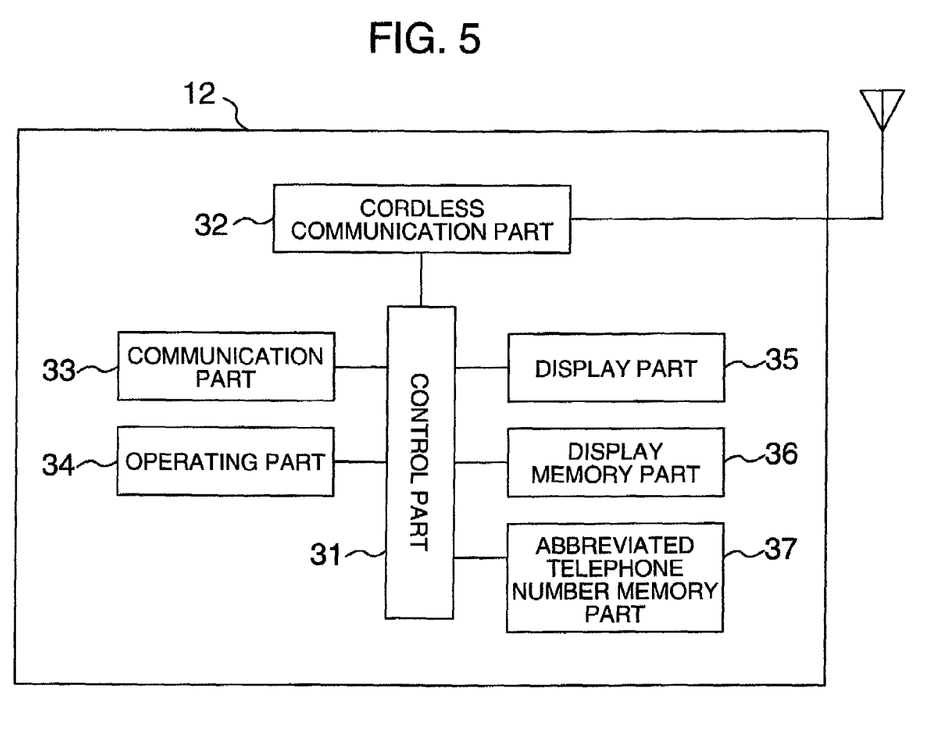
FIG. 5 is a block diagram illustrating a structure of an wireless handset in the cordless telephone system in the embodiment of the present invention.

Referring to FIG. 5, the wireless handset 12 carries out wireless communication in two ways with the base unit 11 by way of the cordless communication part 32 under the control of the control part 31. The control part 31 has a CPU, a RAM, a ROM and the like, and controls in general the wireless handset unit 12.

Since the wireless handset 12 incorporates a communication part 33, it can make communication, similar to the receiver 16 of the base unit 11, and an operating part 34 can effect a function similar to that of the operating part 23 of the base unit 11. It is noted that a display part 35 of the wireless handset ensures an area sufficient for displaying necessary information although this area smaller than that of the display part 22 in the base unit. Further, among voice signals, information signals and instruction signals and the like from the cordless communication part 32, the information signal is once stored in a display memory 36, and is then displayed on the display part 35.

In details, at first, the base unit acquires available information by way of a network by means of its communicating function so that the acquired information is once stored in the display memory 27 in the base unit, and then starts displaying the information on the display part 22. Further, signals of the information displayed on the display part 22 in the base unit 11 are compressed by the compression part 28, and thereafter, are transmitted to the wireless handset 12 by way of the wireless transmission part. Accordingly, the cordless communication part 23 in the wireless handset 12 receives the information signals and displays the same on the display part 35 by way of the display memory part 36.

Further, since this wireless handset 12 has an abbreviated telephone number memory, when an abbreviated number is inputted from the wireless handset 12 through the intermediary of the wireless handset 12, the base unit can call a telephone set on the receiving side having a telephone number corresponding to the abbreviated telephone number.

Moreover, although this wireless handset 12 may merely be the one which has a normal function of cordless communication with the base unit 11, if the wireless handset 11 has a PHS function, the wireless handset 12 can solely communicate with a telephone partner even at a position out of a possible communication range with respect to the base unit 11. Further, the wireless handset 12 may have a function of a mobile telephone which is complicated more or less.

It is noted here that the information service for mobile telephones in this embodiment, is such an information service for equipment having a PHS function or a mobile telephone function in the wireless handset. Accordingly, if the wireless handset 12 can accept the information service for the mobile telephone function, the wireless handset 12 can be connected to an information site by manipulating the wireless handset 12 even at an outside location.

Explanation will be made of the printing function and the forwarding function which can be effected by manipulating the operating part 34 in the wireless handset.

(Printing by Way of Instructions from the Wireless Handset)

Here estimating that information obtained from a connected information site is displayed on the display part 35 of the wireless handset 12, the information is merely displayed on the display part 35 if it is satisfactory to glance the information displayed on the display part 35, but the information can be printed for recording by manipulating the operating part 34 so as to operate the printing part 24 in the facsimile function part 21 of the base unit 11 (as will be detailed later). However, it is possible to carry out the printing on the base unit 11 side under such a condition that the base unit 11 and the wireless handset 12 are located within a range of possible wireless communication.

Explanation will be hereinbelow made of the function of instructing for printing by way of the wireless handset 12.

When the user selects "S newspaper" in an image displayed on the display part 35 of the wireless handset 11, as shown in FIG. 4, so as to send an instruction for displaying an article on the newspaper, an instruction signal produced by the control part 31 is transmitted to the base unit 11 by way of the cordless communication part 32, and is then delivered to the control part 13 of the base unit 11 by way of the wireless receiving part 15 in the base unit 11. Thus, the control part 13 transmits a demand signal corresponding to the instruction signal to an external information service center by way of a network, and as a result, the article on the S newspaper is transmitted to the base unit from the information service center by way of the network, and the display information as to the article of the newspaper is then sent from the center to the base unit 11, and then to the display part 22 by way of the display memory 27 so as to be displayed on the display part 22. Simultaneously, an information signal as to the article is compressed by the compression part 28 in the base unit, and is then transmitted to the cordless communication part 23 in the wireless handset by way of the wireless transmitting part 14. Accordingly, the information signal is displayed on the display part 35 by way of the memory part 36.

Next, the user manipulates the operating part of the wireless handset 12 so as to instruct storing the article of the newspaper, and accordingly, a storing instruction signal produced by the control part 31 in the wireless handset 12 is transmitted to the wireless receiving part 15 in the base unit 11 by way of the cordless communication part 32 in the wireless handset 12. Thus, the control part 13 in the base unit 11 stores the display information which has been stored in the display memory 27 of the base unit 11 and which is before the compression thereof, corresponding to the information displayed on the display part 35 of the wireless handset 12, in the memory part 26 in the base unit 11.

Figure 9:
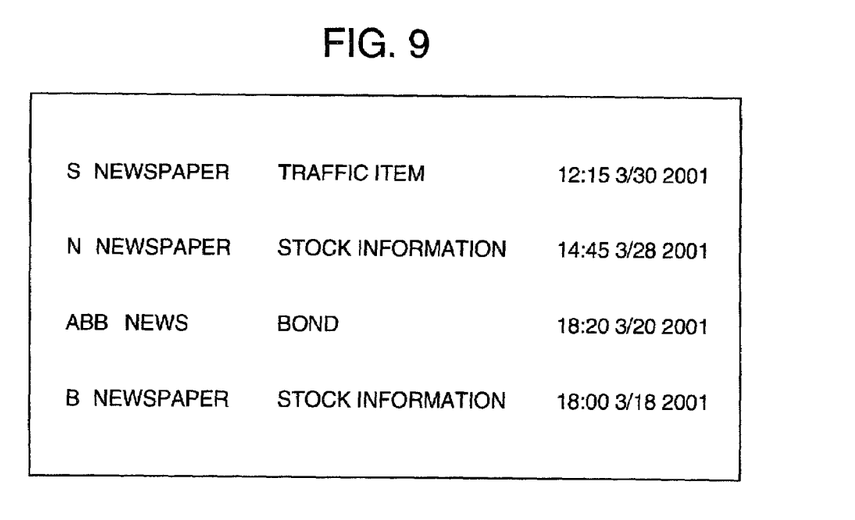
FIG. 9 is a view illustrating a title list which is displayed on the display part of the wireless handset in the embodiment of the present invention.

Further, as to the display information which has been stored the control part 13 in the base unit also stores a menu name from the wireless receiving part 15, a title on display from the display memory 27, and a time obtained from a timer in the control part itself or the present time as a tile for the information, corresponding to the information in the memory part 26 by the instruction from the wireless handset, in response to a storing signal produced from the control part 31 in the wireless handset. Further, as shown in FIG. 9, this tile is displayed in the form of a list on the screen of the display part (as will be detailed later)

Next, when the user manipulates the operating part 34 of the wireless handset 12, it is possible to instruct printing the stored information to the printer part in the base unit.

That is, after the user select one of titles in the title list displayed on the display part of the wireless handset, when the user manipulates the operating part for displaying the information thereof, the display instruction signal produced by the control part 31 in response to an instruction from the operating part 34 of the wireless handset 11, is transmitted to the base unit 11 by way of the cordless communication part 32. Then, the wireless receiving part 15 of the base unit 11 receives the display instruction signal, and the control part 13 in the wireless handset retrieves one of information stored in the memory 26, which corresponds to the above-mentioned title, and delivers the information in the display memory part 27 for displaying the same on the display part 22 of the base unit 11 while the information is delivered to the wireless transmitting part 14 which delivers the information to the wireless handset 23. This information is received by the cordless communication part 32 in the wireless handset 12, and accordingly, the control part 31 stores the same in the display memory part 36 for displaying the information on the display part 35.

Next, a printing instruction is delivered, a printing instruction signal produced from the control part 31 under an instruction from the operating part 34 in the wireless handset 12 is transmitted to the base unit 11 by way of the cordless communication part 32. Then, the wireless receiving part 15 on the base unit receives the printing instruction signal, and accordingly, the control part 13 in the base unit 11 retrieves one of the information stored in the memory 26, corresponding to the above-mentioned title, and transmits the same to the printing part 24 which therefore prints the information.

(Forwarding of Information from the Wireless Handset)

Next, explanation will be made of the information forwarding function of the wireless handset 11.

That is, after the user displays an image of a title list corresponding to an image stored in the memory part 26 in the base unit, on the screen of the display part 22, when the user selects one information from the list, an information selecting signal produced from the control part 31 is transmitted to the base unit, and is then delivered by way of the wireless receiving part 15 in the base unit 11, to the control part 13 which therefore selects the corresponding information in the memory 26 before the compression.

Next, the user displays the above-mentioned abbreviated telephone number on the display screen 35 of the wireless handset, and selects one information in the list with the use of the operating part 34, and accordingly, an information selecting signal produced from the control part 31 is transmitted to the base unit 11 by way of the cordless communication part 32. Thus, the control part 13 selects a telephone number corresponding to the abbreviated telephone number, and stored in the memory part 26.

Further, the user manipulates the operating part 34 in the wireless handset 12 so as to transmit an information transmitting instruction to the base unit 11, the control part 13 which receives a signal of the information transmitting instruction, transmits the selected information together with the selected telephone number to a partner's information terminal unit.

It is noted here that if an external equipment such as a laser printer which can carry out high quality printing is connected to the interface part 25, data is transmitted to the external equipment by manipulating the operating part 34 in the wireless handset 12, and accordingly, information displayed on the display part 35 of the wireless handset 12 can be printed by the external equipment.

Further, in such a case that the wireless handset 12 solely accept an information service for mobile telephones, the information obtained on the wireless handset 12 can be transmitted to the base unit 11 after it is converted into data which can be received by the base unit side 11 within the range of possible cordless communication, and accordingly, the information obtained by the wireless handset 12 can be transmitted to the base unit 11 so as to be displayed on the display part 22 of the base unit 11. Further, information displayed on the display part 35 of the wireless handset 12 can be transmitted to the base unit 11 so as to be printed on the base unit 11 side.

As mentioned above, in this embodiment, the wireless handset 12 and the base unit 11 in a pair accept information services for stationary telephone sets. Accordingly, if the wireless handset is the one which solely accepts information services for mobile telephones, for example, a PHS, the wireless handset 12 is used as an inherent wireless handset within a home where the base unit 11 is installed, and accordingly, information services for stationary telephone sets are available for the wireless handset 12. Further, outdoor, the wireless handset 12 can be used as a PHS, and accordingly, information services for mobile telephones is also available for the wireless handset 12. Thus, the wireless handset can accept information services for both stationary telephone sets and mobile telephones.

Many modifications and variations of the present invention are possible in the light of the above-mentioned techniques. It is therefore to be understood that within the scope of the appended claims the invention may be practices otherwise than as specifically described.

What is claimed is:

1. A cordless telephone system comprising:
    a base unit which accepts information services for stationary telephone sets and which transmits and receives various signals via a network; and
    a wireless handset for wireless communication with an external telephone through the intermediary of said base unit, said handset including a display therein, wherein said handset:
    transmits an instruction signal through the intermediary of said base unit to an external information service via the network,
    receives information, which includes at least one of news, banking, ticket, bond, insurance, town, administration, dictionary, traffic, and stock, corresponding to the instruction signal from the external information service through the intermediary of said base unit, and
    displays the information on said display.

2. The cordless telephone system according to claim 1, wherein said network is one of an exclusive network and the Internet.

3. The cordless telephone system according to claim 1, wherein the information includes several menus.

4. The cordless telephone system according to claim 1, wherein said wireless handset further comprises a mode for operation as a mobile telephone that communicates with a telephone partner outside of a communication range with respect to said base unit.

5. The cordless telephone system according to claim 1, wherein said wireless handset decompresses said information corresponding to the instruction signal from the external information service through the intermediary of said base unit.

6. The cordless telephone system according to claim 1, wherein said base unit includes an interface for connection to a printer or a facsimile device and said wireless handset instructs printing of said information corresponding to the instruction signal from the external information service through the intermediary of said base unit.

7. The cordless telephone system according to claim 1, wherein said wireless handset includes a forwarding function to forward said information corresponding to the instruction signal from the external information service through the intermediary of said base unit to a partner's information terminal unit.

8. A cordless telephone system comprising:
    a base unit which accepts information services for stationary telephone sets and which transmits and receives various signals via a network; and
    a wireless handset for wireless communication with an external telephone through the intermediary of said base unit, said handset including a display therein, wherein:
    said handset transmits an instruction signal to said base unit,
    said base unit transmits a demand signal corresponding to the instruction signal to an external information service via the network, receives information, which includes at least one of news, banking, ticket, bond, insurance, town, administration, dictionary, traffic, and stock, corresponding to the demand signal from the external information service, and transmits signals of the information to said handset, and
    said handset receives the signals of the information and displays the information on said display.

9. The cordless telephone system according to claim 8, wherein said network is one of an exclusive network and the Internet.

10. The cordless telephone system according to claim 8, wherein the information includes several menus.

11. The cordless telephone system according to claim 8, wherein said wireless handset further comprises a mode for operation as a mobile telephone that communicates with a telephone partner outside of a communication range with respect to said base unit.

12. The cordless telephone system according to claim 8, wherein said wireless handset decompresses said signals of the information.

13. The cordless telephone system according to claim 8, wherein said base unit includes an interface for connection to a printer or a facsimile device and said wireless handset instructs printing of said signals of the information.

14. The cordless telephone system according to claim 8, wherein said information corresponding to the instruction signal from the external information service through the intermediary of said base unit comprises charge information and said base unit registers said charge information in a memory to automatically register said charge information for both said base unit and said wireless handset.

15. The cordless telephone system according to claim 8, wherein said wireless handset includes a forwarding function to forward said signals of the information to a partner's information terminal unit.

16. A method of obtaining information of an external information service from a wireless handset of a cordless telephone system through the intermediary of a base unit including:
    a step of transmitting an instruction signal from said handset through the intermediary of said base unit to an external information service via a network,
    a step of receiving information, which includes at least one of news, banking, ticket, bond, insurance, town, administration, dictionary, traffic, and stock, corresponding to the instruction signal from the external information service through the intermediary of said base unit in said handset, and
    a step of displaying the information on a display in said handset.

17. The method according to claim 16, wherein said network is one of an exclusive network and the Internet.

18. A method of obtaining information of an external information service from a wireless handset of a cordless telephone system through the intermediary of a base unit including:
    a step of transmitting an instruction signal from said handset to said base unit,
    a step of transmitting a demand signal corresponding to said instruction signal to an external information service via a network, a step of receiving information, which includes at least one of news, banking, ticket, bond, insurance, town, administration, dictionary, traffic, and stock, corresponding to the demand signal from the external information service, and transmitting signals of the information to said handset, and a step of receiving the signals of the information, and a step of displaying the information on a display in said handset.

19. The method according to claim 18, wherein said network is one of an exclusive network and the Internet.

\* \* \* \* \*